(12) United States Patent
Suzuki et al.

(10) Patent No.: US 7,063,390 B2
(45) Date of Patent: Jun. 20, 2006

(54) SEAT BELT SYSTEM

(75) Inventors: Masaya Suzuki, Iwata-Gun (JP); Kenichiro Maruo, Hamamatsu (JP)

(73) Assignee: Suzuki Motor Corporation (JP)

( * ) Notice: Subject to any disclaimer, the term of this patent is extended or adjusted under 35 U.S.C. 154(b) by 102 days.

(21) Appl. No.: 10/865,442

(22) Filed: Jun. 10, 2004

(65) Prior Publication Data

US 2004/0262979 A1 Dec. 30, 2004

(30) Foreign Application Priority Data

Jun. 13, 2003 (JP) .................................. P2003-168734

(51) Int. Cl.
*B60R 21/00* (2006.01)

(52) U.S. Cl. ........................................ 297/483; 297/474

(58) Field of Classification Search ................ 297/483, 297/474, 475, 468, 248, 250.1; 280/807, 280/808, 801.1
See application file for complete search history.

(56) References Cited

U.S. PATENT DOCUMENTS

| | | | | |
|---|---|---|---|---|
| 4,431,233 A | * | 2/1984 | Ernst ........................... | 297/468 |
| 5,280,995 A | * | 1/1994 | Elton ........................... | 297/238 |
| 5,328,249 A | * | 7/1994 | Ball ............................ | 297/483 |
| 5,529,376 A | * | 6/1996 | Jovan et al. ................. | 297/257 |
| 5,716,073 A | * | 2/1998 | Redman .................... | 280/801.1 |
| 6,068,341 A | * | 5/2000 | Rink ........................... | 297/483 |
| 6,508,515 B1 | * | 1/2003 | Vits et al. .................... | 297/483 |
| 6,676,219 B1 | * | 1/2004 | Brewer ........................ | 297/485 |

FOREIGN PATENT DOCUMENTS

| | | |
|---|---|---|
| DE | 44 05 345 A1 | 8/1995 |
| DE | 4405345 | * 8/1995 |
| DE | 19814845 | * 10/1999 |
| DE | 198 14 845 A1 | 10/1999 |
| JP | 10-175466 A | 6/1998 |

* cited by examiner

*Primary Examiner*—Milton Nelson, Jr.
(74) *Attorney, Agent, or Firm*—Lerner, David, Littenberg, Krumholz & Mentlik, LLP

(57) ABSTRACT

There is provided a seat belt system in which a seat belt retractor is installed in a seat back assembled to a rear portion of a seat cushion, and a belt anchor plate, which is provided at the tip end of a seat belt pulled out of the seat belt retractor, is brought from the seating surface side to the back surface side of the seat cushion and is installed to a seat cushion frame constituting the seat cushion from the back side of the seating surface of the seat cushion.

5 Claims, 6 Drawing Sheets

SEAT BELT SYSTEM

FIELD OF THE INVENTION

The present invention relates to a seat belt system and, more particularly, to a seat belt anchor attaching construction where a seat belt retractor is installed in a seat back.

A seat belt system has been proposed in which when the seat belt system is provided on a seat having a seat back assembled to the rear part of a seat cushion, all anchor points (fixing points for parts constituting the seat belt system) are disposed on the seat side (for example, see Japanese Patent Provisional Publication No. 10-175466 (No. 175466/1998)). FIG. 8 shows a belt anchor plate attaching portion in the conventional seat belt system of this type. In the case shown in FIG. 8, a seat belt retractor (not shown) is installed in a seat back, and a belt anchor plate 31 provided at the tip end of a seat belt 30 pulled out of the seat belt retractor is attached to a seat cushion frame 33 constituting a seat cushion 32 with a bolt 34.

SUMMARY OF THE INVENTION

However, the above-described conventional seat belt system provided on the seat has the following problems:

A space S (see FIG. 8) must be provided in the surface 25 (proprietary surface) of seat cushion to accommodate a bolt tightening tool 35 such as a wrench for installing the belt anchor plate 31 to the seat cushion frame 33.

The provision of the space S may mar the appearance because seat interior members (structural members) are seen through the space S.

As measures to prevent appearance from being marred, a cover etc. for covering the space S must be provided separately.

Also, a configuration can be thought of in which as 10 shown in FIG. 9, a seat belt 41 is divided into first and second belt portions 41a and 41b by using a mini buckle 40 as necessary, and the mini buckle 40 is engaged by pulling out the second seat belt portion 41b from the seating surface M of a seat cushion 42 via a slit 43 provided in the seat cushion 42. However, this configuration has a problem of increased cost.

The present invention has been made in view of the above situation, and accordingly a main object thereof is to provide a seat belt system which can avoid deterioration in design (appearance) of a seating surface of a seat cushion without the use of a special construction, and has a simple and inexpensive construction such that a separate part such as a cover for improving the appearance is not needed.

To achieve the above object, in the present invention, a seat belt retractor is installed in a seat back assembled to a rear portion of a seat cushion, and a belt anchor plate, which is provided at the tip end of a seat belt pulled out of the seat belt retractor, is brought from the seating surface side to the back surface side of the seat cushion and is installed to a seat cushion frame constituting the seat cushion from the back side of the seating surface of the seat cushion.

Also, in the present invention, a seat consisting of the seat cushion and seat back is one seat of two unequally divided sears that are divided so that one seat is larger than the other seat, and the belt anchor plate is for a center seat.

Further, in the present invention, the belt anchor plate is inserted through a slit formed in the seat cushion from the seating surface to the back surface of the seat cushion, and a buckle for side seat is inserted in the slit and is arranged.

DETAILED DESCRIPTION OF PREFERRED EMBODIMENTS

Embodiments of the present invention will now be described with reference to FIGS. 1 to 7.

Figure 1:
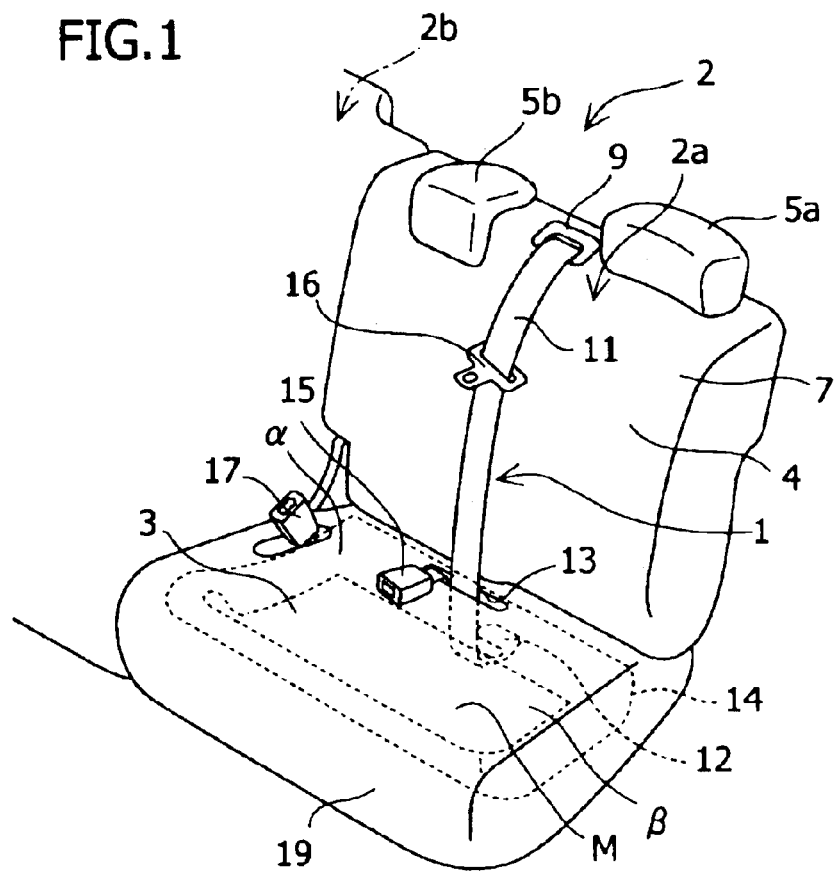
FIG. 1 is a perspective view of an automotive seat provided with a seat belt system (seat belt system for center seat) in accordance with one embodiment of the present invention.

FIG. 1 shows an automotive seat 2 provided with a seat belt system (seat belt system for center seat) 1 in accordance with one embodiment of the present invention. This seat 2 is a seat formed by arranging two unequally divided seats 2a and 2b, which are disposed at a rear position in a cabin, in the vehicle width direction. Each of the unequally divided seats 2a and 2b has a seat cushion 3 on which a passenger sits and a seat back 4 assembled so as erect at the rear part of the seat cushion 3. "Unequally divided seats 2a and 2b" means seats that are formed by dividing so that one seat is larger than the other seat, and in this embodiment, the seat is divided at a width ratio of 6:4. The relatively wider unequally divided seat 2a is designed so that two passengers can sit thereon, and hence the seat back 3 of the unequally divided seat 2a is fitted with two headrests 5a and 5b. Thus, a half portion a, of the above-described unequally divided seat 2a, on the unequally divided seat 2b side is used as a center seat, and a half portion (3 on the opposite side is used as a side seat (see FIGS. 1 and 4). The relatively narrower unequally divided seat 2b is designed so that one passenger can sit thereon.

Figure 2:
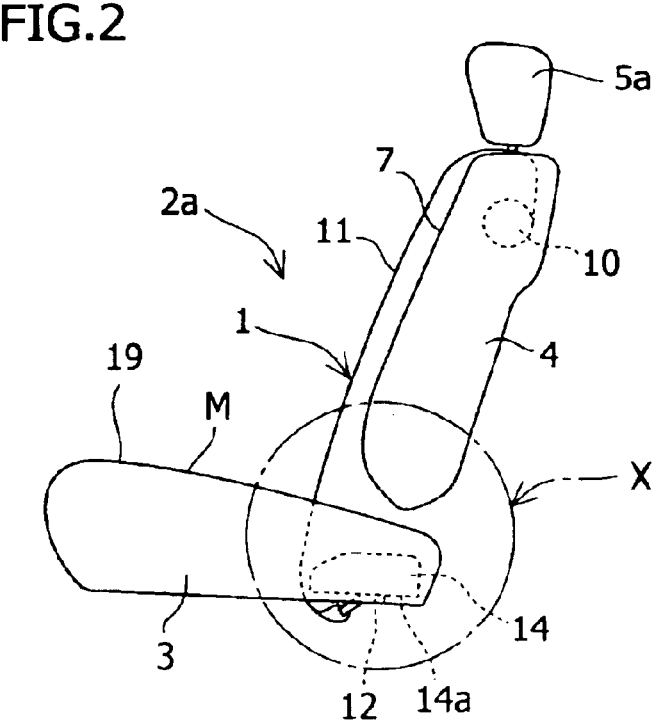
FIG. 2 is a side view of the automotive seat shown in FIG. 1.
Figure 3:
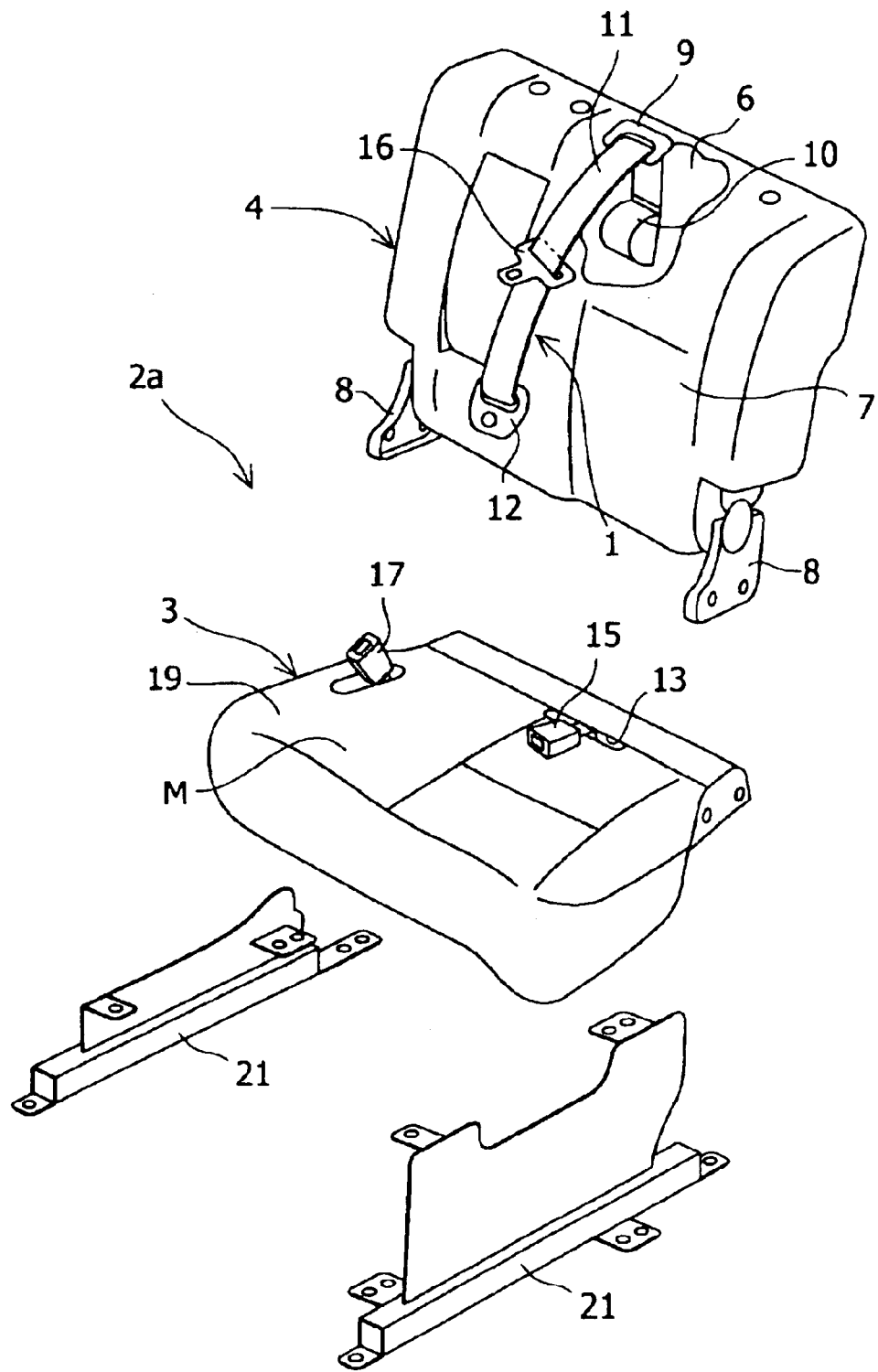
FIG. 3 is an exploded perspective view of an unequally divided seat constituting a part of an automotive seat.

The above-described unequally divided seat 2a is provided with the seat belt system 1 for center seat. Here, the arrangement construction of the seat belt system 1 is described. As shown in FIG. 3, the seat back 4 of the unequally divided seat 2a is constructed as an assembly made up of a seat back frame 6 constituting a frame, a urethane foam-made cushion pad (not shown) assembled to the seat back frame 6, a cushion trim (seat skin) 7 covering the surface of the cushion pad, and reclining devices 8. As shown in FIGS. 2 and 3, a seat belt retractor 10 is incorporated in the seat back 4. Specifically, the seat belt retractor 10 is fixedly attached to the seat back frame 6, and a seat belt 11 is pulled out of the seat belt retractor 10. The seat belt 11 pulled out of the seat belt retractor 10 is laid on the front side of the seat back 4 in a state of being inserted through a through guide 9 provided (fixed) at a location between the headrests 5a and 5b in an upper end portion of the seat back 4.

Figure 5:
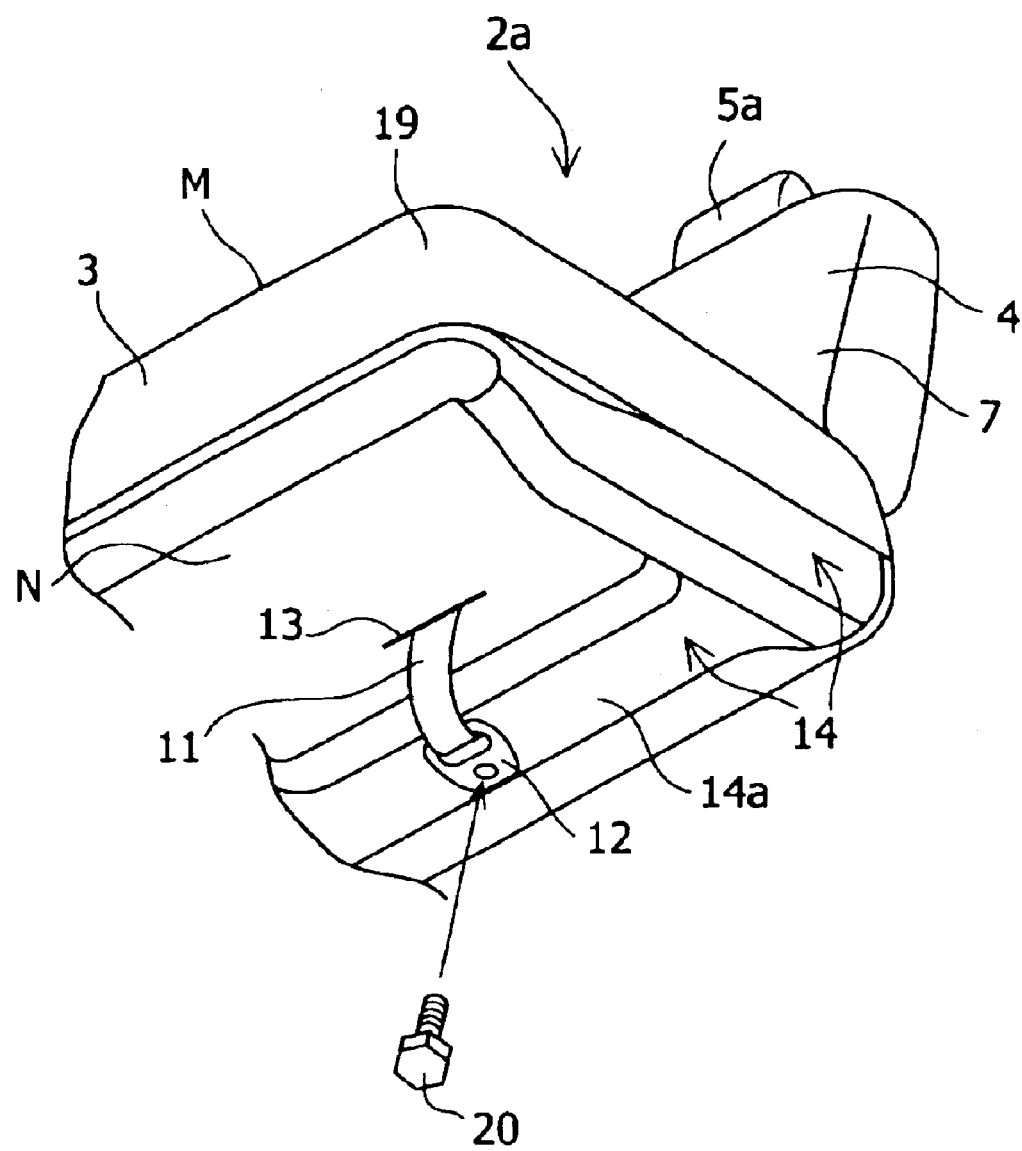
FIG. 5 is a perspective view of an unequally divided seat, which is viewed from the downside.
Figure 6:
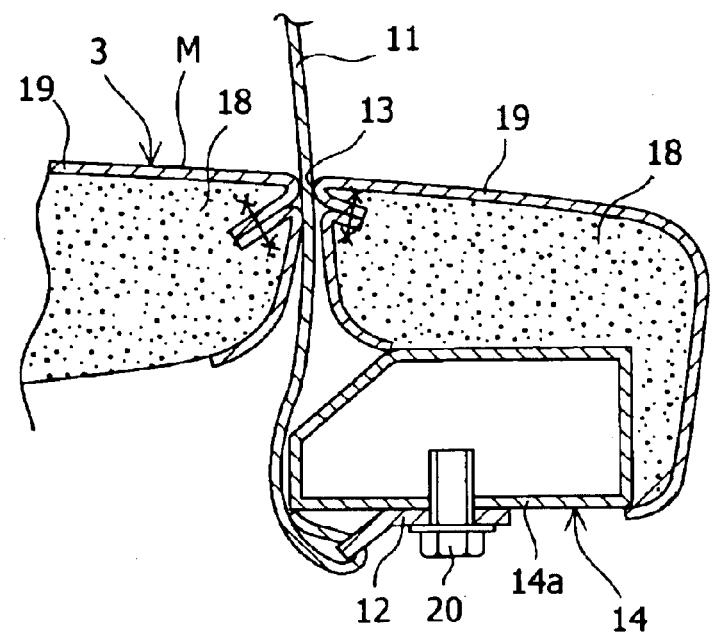
FIG. 6 is an enlarged sectional view showing a portion indicated by symbol X in FIG. 2.

Also, at the tip end of the seat belt 11 laid on the front side of the seat back 4 is fixed a belt anchor plate 12, and, as shown in FIGS. 1, 5 and 6, the belt anchor plate 12 is inserted through a slit 13 formed in a tear edge portion in the center in the width direction of a seating surface M of the seat cushion 3 and is brought from the seating surface M side to the back surface N side of the seat cushion 3 (see FIG. 5). As clearly shown in FIGS. 5 and 6, the belt anchor plate 12 is fixed to a lower surface 14a of a seat cushion frame 14 constituting a frame of the seat cushion 3 from the back side of the seating surface M of the seat cushion 3 with a bolt 20. Thus, the above-described belt anchor plate 12 is disposed as a component part of the seat belt system 1 for center seat. On the other hand, in the above-described slit 13 for inserting belt anchor plate, a buckle 15 for side seat is inserted in addition to the seat belt 11.

Also, the seat belt 11 laid on the front side of the seat back 4 is mounted with a tongue 16, and a buckle 17 for center seat for engaging this tongue 16 is provided at a side position of the unequally divided seat 2a close to the seat 2b.

Next, the procedure for installing the seat belt system 1 will be described. First, the seat back 4 and the seat cushion 3 are assembled to each other separately as a separate assembly. In assembling the seat back 4, as shown in FIG. 3, the seat belt retractor 10 is installed to the seat back frame 6 constituting the frame of seat back 4, the urethane foam-made cushion pad (not shown) is assembled to the seat back frame 6, and the cushion trim 7 covering the surface of the cushion pad is assembled. Further, the reclining devices 8 are assembled to predetermined locations on the seat back frame 6 (see FIG. 3), by which the seat back 4 as a back assembly is constructed. At this time, the belt anchor plate 12 provided at the tip end of the seat belt 11 is kept in a state of being pulled out to the front side of the seat back 4.

On the other hand, in assembling the seat cushion 3, the buckle 15 for side seat is installed to the seat cushion frame 14, and a cushion pad 18 and a cushion trim 19 (see FIG. 6) are assembled. The buckle 15 is installed in a state of being inserted through the slit 13 formed in the cushion pad 18 and the cushion trim 19. Thereby, the seat cushion 3 as a cushion assembly is constructed.

Thereafter, the seat back 4 is assembled to the rear part of the seat cushion 3 via the reclining devices 8, and seat slides 21 are assembled to the lower portions of the seat cushion 3. Subsequently, the belt anchor plate 12 coming out of the seat back 4 is inserted through the slit 13 in the seat cushion 3 from the upside to the downside, being pulled down to the lower surface 14a of the seat cushion frame 14, and is fixed to the lower surface 14a of the seat cushion frame 14 by inserting and tightening the bolt 20 from the lower side of the seat cushion frame 14. After the unequally divided seat 2a is assembled by assembling the seat cushion 3 and the seat back 4 to each other as described above, as shown in FIG. 4, the seat slides 21 fixed to the unequally divided seat 2a are installed onto a floor panel of a vehicle body.

Figure 4:
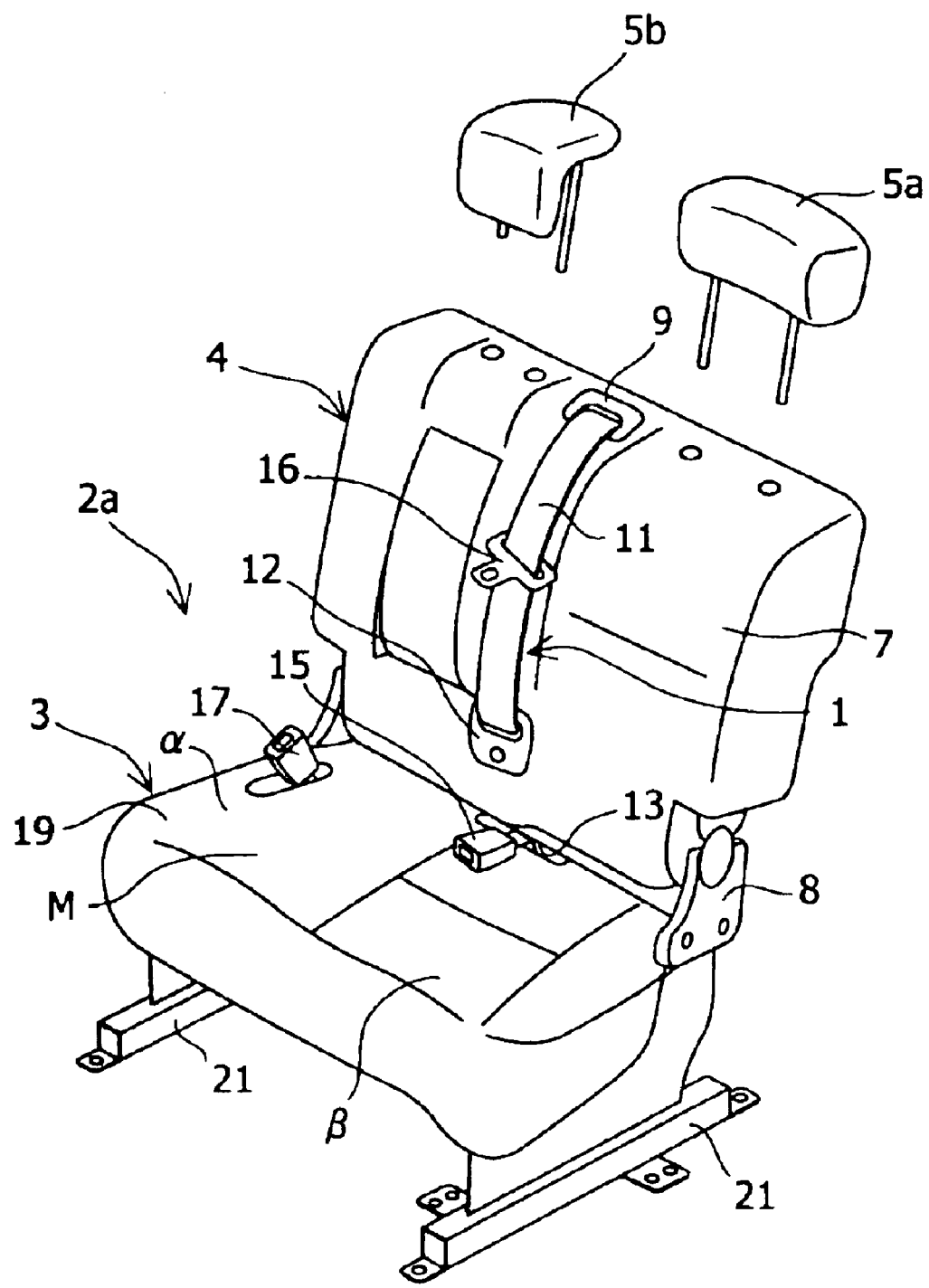
FIG. 4 is a perspective view showing a state in which an unequally divided seat has been assembled.

A procedure in which the seat belt retractor 10 is installed after the belt anchor plate 12 has been installed can be thought of. However, such a procedure is not so favorable. The reason for this is that since the seat belt retractor 10 is a part larger than the belt anchor plate 12, the size of the slit 13 for allowing the seat belt retractor 10 to pass through must be increased, and the construction becomes complicated because a hole for assembling the seat belt retractor 10 is formed in the cushion pad and cushion trim of the seat back 4, or the hole is formed in the cushion pad 18 and the cushion trim 19 of the seat cushion 3 and a cover for concealing the hole must be provided. Also, in this embodiment, since the seat slides 21 are provided under the unequally divided seat 2 as shown in FIGS. 3 and 4, it is preferable that the belt anchor plate 12 be installed to the seat cushion frame 14 as described above, not to the floor panel of the vehicle body.

As described above, for the seat belt system 1 in accordance with this embodiment, the belt anchor plate 12, which is provided at the tip end of the seat belt 11 pulled out of the seat belt retractor 10 installed in the seat back 4, is caused to pass through from the seating surface M side to the back surface N side of the seat cushion 3 assembled to the lower part of the seat back 4 via the reclining devices 8 and is brought to the lower surface 14a of the seat cushion frame 14, and is installed to the lower surface 14a from the back side of the seating surface M of the seat cushion 3. Therefore, the seat belt system 1 can achieve the operation and effects as described below. By setting a seat belt anchor point (attachment position of the belt anchor plate 12) on the lower surface 14a of the seat cushion frame 14, work for bringing a tool for bolting the belt anchor plate 12 to the seat belt anchor point (tool access work) can be performed easily from the downside of the seat cushion frame 14, so that there is no need for providing a tool access space on the seating surface M, which is the upper surface (proprietary surface) of the seat cushion 3. Therefore, a trouble can be avoided such that the appearance of the seating surface M of the seat cushion 3 is marred by the presence of the tool access space.

Figure 9:
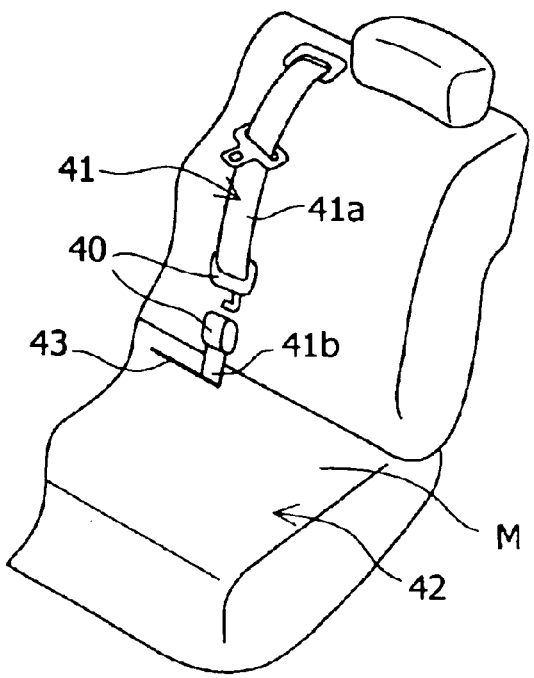
FIG. 9 is a perspective view of a conventional seat belt system in which a seat belt is divided by using a mini buckle.

Also, in installing the belt anchor plate 12 to the seat cushion frame 14, the belt anchor plate 12 is inserted through the slit 13 provided in the seating surface M of the seat cushion 3. Therefore, an advantage wherein seat structural parts (seat interior parts) lying on the inside of the seating surface M are not seen from the seating surface M side can be achieved. Also, since the seat belt 11 is used without being divided, a mini buckle 40 (see FIG. 9) for dividing the seat belt 11 need not be used.

Figure 7:
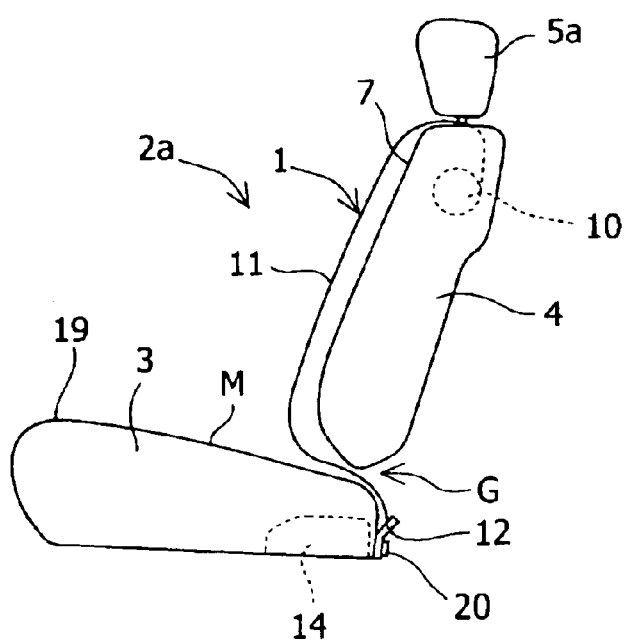
FIG. 7 is a side view of the automotive seat provided with a seat belt system in accordance with another embodiment of the present invention.
Figure 8:
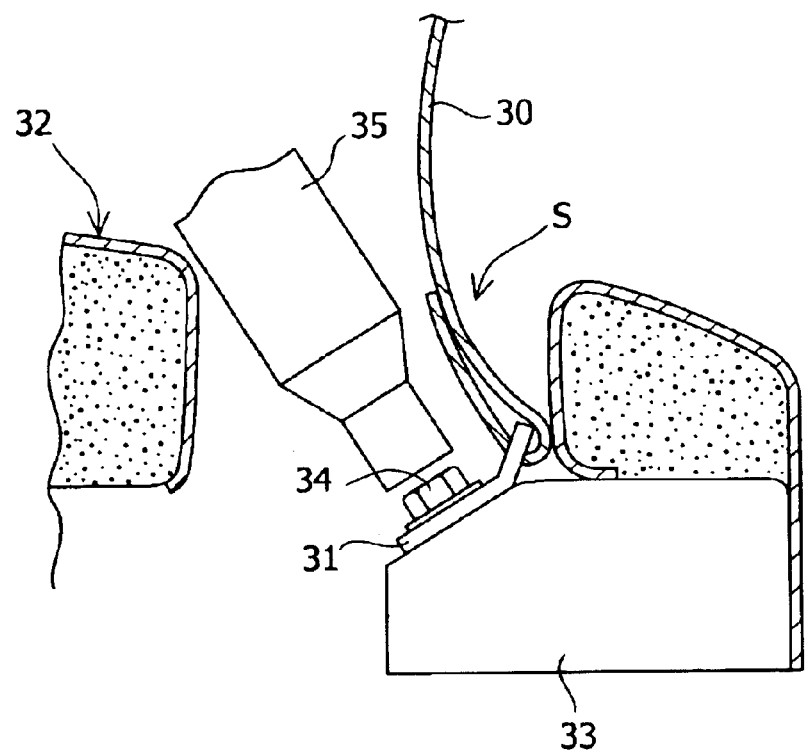
FIG. 8 is a view for illustrating installation work for installing a belt anchor plate in the case of a conventional seat belt system, the view corresponding to FIG. 6.

The above is a description of one embodiment of the present invention. The present invention is not limited to the above-described embodiment, and various changes and modifications can be made on the basis of the technical concept of the present invention. For example, in the above-described embodiment, the seat belt 11 is inserted through the slit 13 provided in the seat cushion 3, and the belt anchor plate 12 is installed to the lower surface 14a of the seat cushion frame 14. However, as shown in FIG. 7, the configuration may be such that the seat belt 11 is caused to pass through a gap G between the seat cushion 3 and the seat back 4 and the belt anchor plate 12 is installed to a rear face portion of the seat cushion frame 14 (for example, a rear side location of the seat portion p for side seat of the unequally divided seat 2a). In this case as well, as in the above-described embodiment, the belt anchor plate 12 is brought from the seating surface M side to the back surface N side of the seat cushion 3 and is installed to the seat cushion frame 14 from the back side of the seating surface M of the seat cushion 3. Thereby, the belt anchor plate 12 can be installed without exerting an influence of appearance on the seating surface M (top surface) of the seat cushion 3.

Also, in the above-described embodiment, the seat belt system 1 is assembled to the relatively wider unequally divided seat 2a. However, the seat belt system 1 for center seat can be assembled to the relatively narrower unequally divided seat 2b.

As described above, the present invention is configured so that the seat belt retractor is installed in the seat back assembled to a rear portion of the seat cushion, and the belt anchor plate, which is provided at the tip end of the seat belt pulled out of the seat belt retractor, is brought from the seating surface side to the back surface side of the seat cushion and is installed to the seat cushion frame constituting the seat cushion from the back side of the seating surface of the seat cushion. Therefore, in the construction in which the seat back incorporating the seat belt retractor is turnably installed to the seat cushion, for example, via the reclining devices, even if the belt anchor plate for the seat belt is assembled to the seat cushion frame, deterioration in design (appearance) of the seating surface of the seat cushion can be avoided without the use of a special construction. Therefore, according to the present invention, there can be provided a seat belt system having a simple and inexpensive construction such that a separate part such as a cover for improving the appearance is not needed.

Also, in the present invention, the seat consisting of the seat cushion and seat back is one seat of two unequally divided seats that are divided so that one seat is larger than the other seat, and the belt anchor plate is for a center seat. Therefore, even in the case where the belt anchor plate of the seat belt system for center seat, in which the seat belt retractor is arranged in a substantially central portion in the vehicle width direction of the seat, cannot be installed to the side face of the seat cushion, the belt anchor plate can be assembled without a special construction in such a manner that the design (appearance) of the seating surface of the seat cushion is not deteriorated.

Also, in the present invention, the belt anchor plate is inserted through a slit formed in the seat cushion from the seating surface to the back surface of the seat cushion, and a buckle for side seat is inserted in the slit and is arranged. Therefore, the slit provided in the seat cushion can be used commonly as an inserting portion for the buckle for side seat and the belt anchor plate for center seat.

What is claimed is:

1. A seat belt system comprising:
   a seat having a seat back connected to a rear portion of a seat cushion, the seat cushion including a seat cushion frame;
   a seat belt retractor installed in the seat back;
   a seat belt having a first end connected to said seat belt retractor, the seat belt capable of being pulled out of said seat belt retractor; and
   a belt anchor plate connected to a second end of said seat belt;
   wherein said belt anchor plate is brought from a top side of the seat cushion to a bottom side of the seat cushion and is installed to the seat cushion frame from the bottom side.

2. The seat belt system according to claim 1, wherein the seat further includes two unequally divided seat portions that are divided so that a first seat portion is larger than a second seat portion.

3. The seat belt system according to claim 2, wherein the first seat portion further includes a side seat and a center seat, said seat belt system being adapted for the center seat.

4. The seat belt system according to claim 1, wherein said belt anchor plate is inserted through a slit formed in the seat cushion, the slit extending from the top side to the bottom side of the seat cushion.

5. The seat belt system according to claim 4, further including a buckle inserted in the slit.

* * * * *